(12) United States Patent
Tkaczyk et al.

(10) Patent No.: US 7,573,040 B2
(45) Date of Patent: Aug. 11, 2009

(54) ENERGY DISCRIMINATING DETECTOR DIFFERENT MATERIALS DIRECT CONVERSION LAYERS

(75) Inventors: J. Eric Tkaczyk, Delanson, NY (US);
Wen Li, Clifton Park, NY (US);
Yanfeng Du, Rexford, NY (US); James W. LeBlanc, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/690,374

(22) Filed: Mar. 23, 2007

(65) Prior Publication Data
US 2008/0230709 A1 Sep. 25, 2008

(51) Int. Cl.
*G01T 1/24* (2006.01)

(52) U.S. Cl. .................................. 250/370.09
(58) Field of Classification Search ........... 250/370.01–370.15; 378/98.8
See application file for complete search history.

(56) References Cited

U.S. PATENT DOCUMENTS

| 4,926,052 | A * | 5/1990 | Hatayama et al. ...... 250/370.14 |
| 6,255,708 | B1 * | 7/2001 | Sudharsanan et al. ....... 257/428 |
| 7,274,768 | B2 * | 9/2007 | Green ........................ 378/57 |
| 2001/0004548 | A1 * | 6/2001 | French ...................... 438/585 |
| 2003/0035510 | A1 * | 2/2003 | Strommer .................. 378/98.8 |
| 2005/0253079 | A1 * | 11/2005 | Hoffman ............... 250/370.13 |
| 2006/0056581 | A1 * | 3/2006 | Hoffman et al. ............. 378/19 |

\* cited by examiner

*Primary Examiner*—David P Porta
*Assistant Examiner*—Kiho Kim
(74) *Attorney, Agent, or Firm*—Patrick K. Patnode

(57) ABSTRACT

A diagnostic imaging system includes a high frequency electromagnetic energy source that emits a beam of high frequency electromagnetic energy toward an object to be imaged. An energy discriminating (ED) detector receives high frequency electromagnetic energy emitted by the high frequency electromagnetic energy source. The ED detector includes a first direct conversion layer and a second direct conversion layer. The first direct conversion layer comprises a first direct conversion material and the second direct conversion layer comprises a second direct conversion material that is different from the first direct conversion material. A data acquisition system (DAS) is operably connected to the ED detector and a computer operably connected to the DAS.

20 Claims, 6 Drawing Sheets

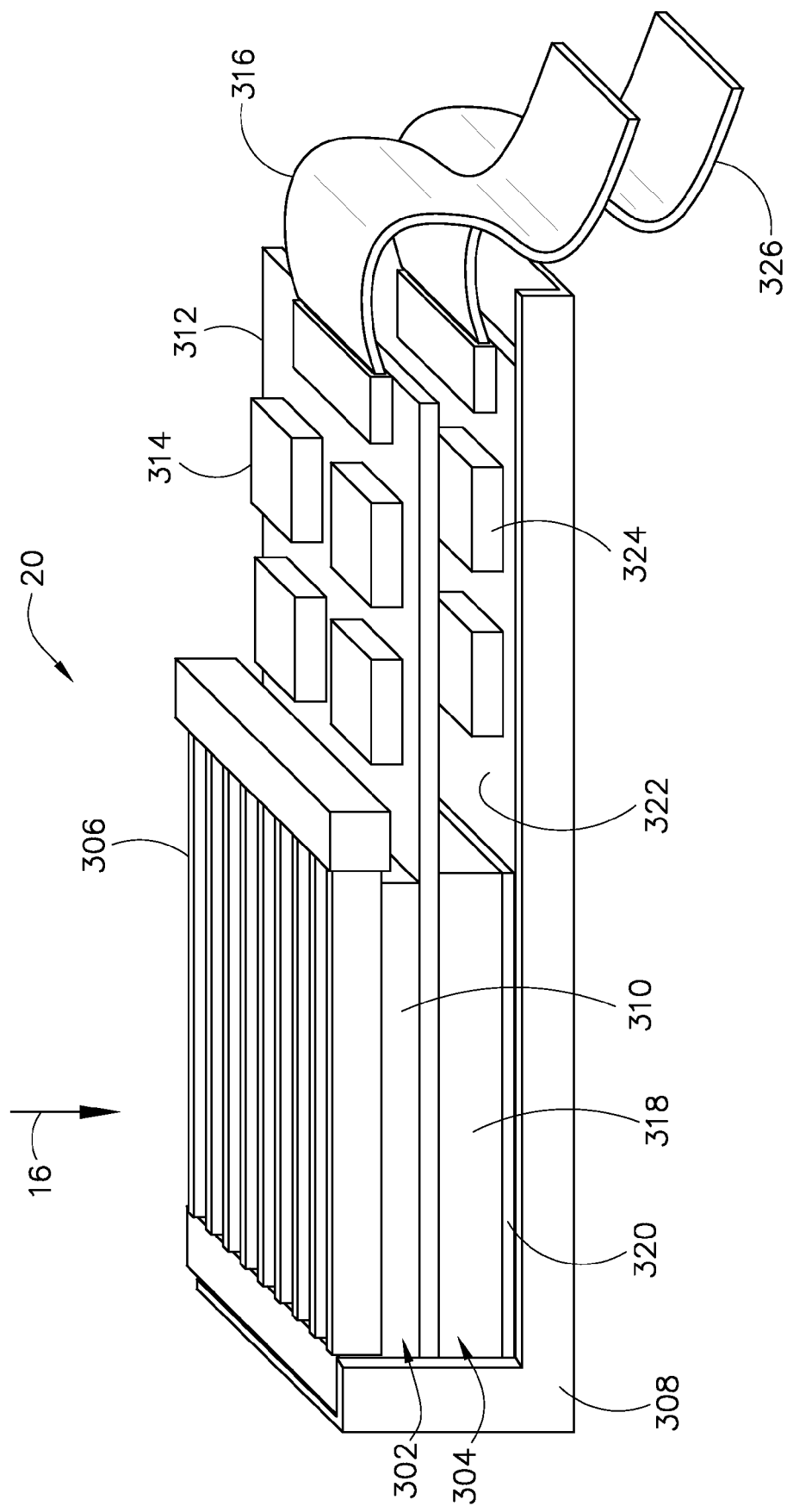

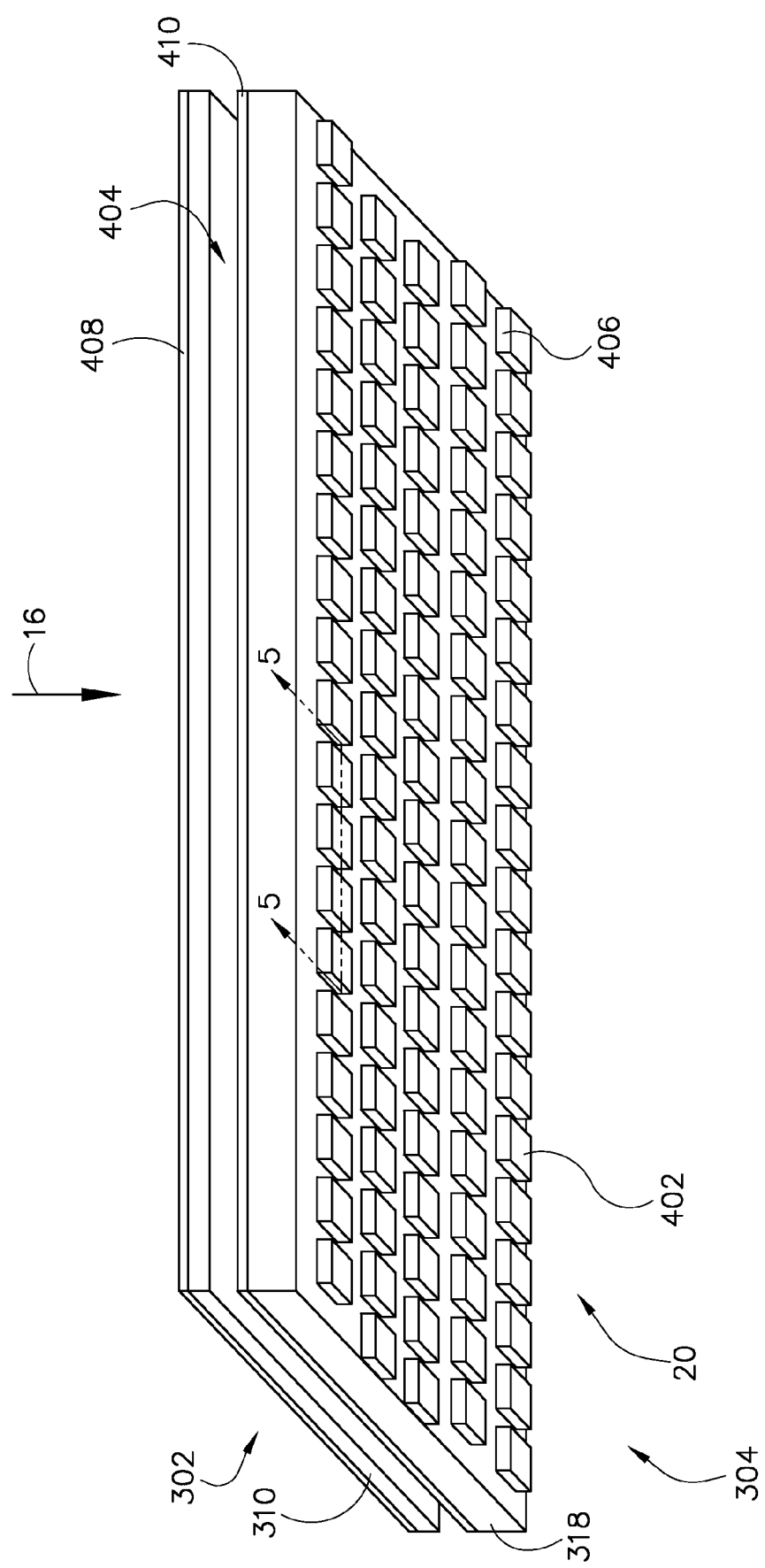

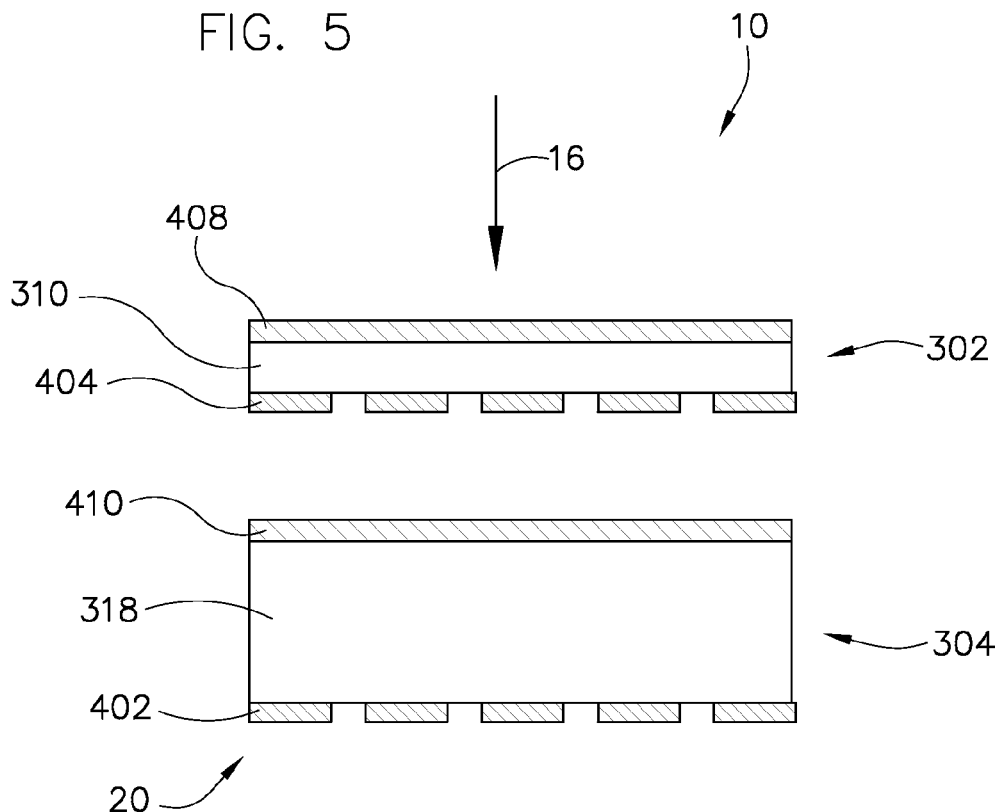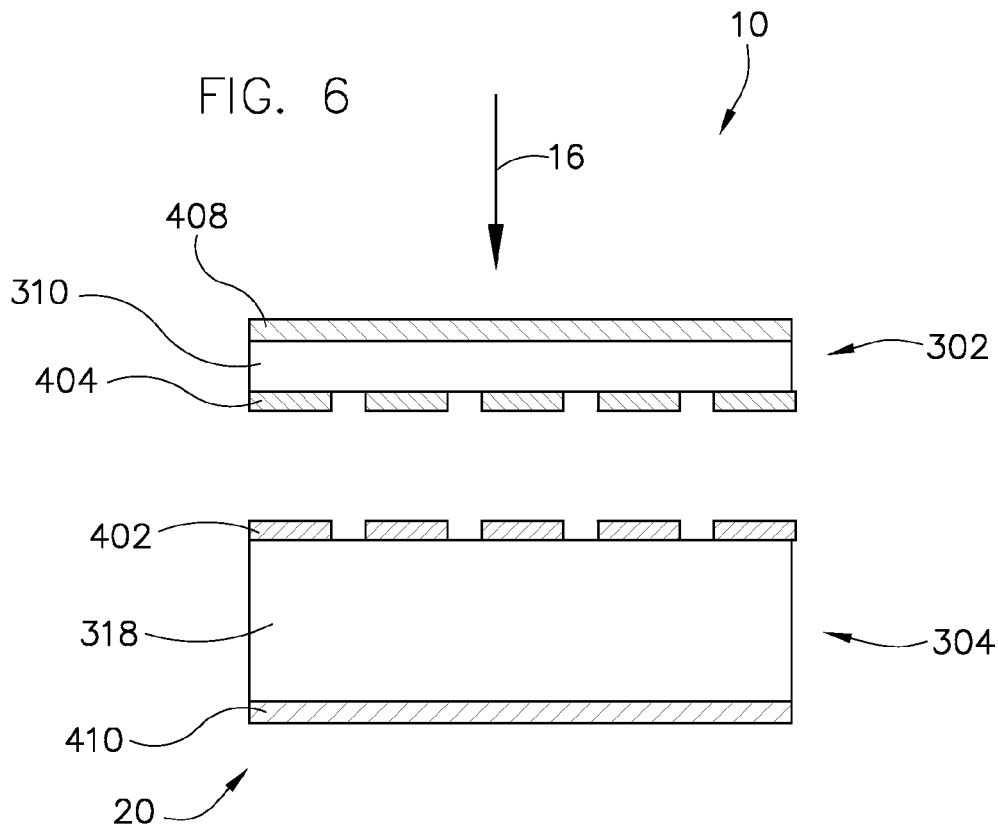

ENERGY DISCRIMINATING DETECTOR DIFFERENT MATERIALS DIRECT CONVERSION LAYERS

BACKGROUND OF THE INVENTION

The present invention relates generally to diagnostic imaging and, more particularly, to a method and apparatus of high flux rate imaging with energy discrimination, such as in computed tomography (CT) applications.

Exemplary diagnostics devices comprise x-ray systems, magnetic resonance (MR) systems, ultrasound systems, computed tomography (CT) systems, positron emission tomography (PET) systems, and other types of imaging systems. Typically, in CT imaging systems, an x-ray source emits a fan-shaped beam toward a subject or object, such as a patient or a piece of luggage. Hereinafter, the terms "subject" and "object" shall include anything capable of being imaged. The beam, after being attenuated by the subject, impinges upon an array of radiation detectors. The intensity of the attenuated beam radiation received at the detector array is typically dependent upon the attenuation of the x-ray beam by the subject. Each detector element of the detector array produces a separate electrical signal indicative of the attenuated beam received by each detector element. The electrical signals are transmitted to a data processing system for analysis which ultimately produces an image.

Generally, the x-ray source and the detector array are rotated about the gantry opening within an imaging plane and around the subject. X-ray sources typically include x-ray tubes, which emit the x-ray beam at a focal point. X-ray detectors typically include a collimator for collimating x-ray beams received at the detector, a scintillator for converting x-rays to light energy adjacent the collimator, and photodiodes for receiving the light energy from the adjacent scintillator and producing electrical signals therefrom.

Typically, each scintillator of a scintillator array converts x-rays to light energy. Each scintillator discharges light energy to a photodiode adjacent thereto. Each photodiode detects the light energy and generates a corresponding electrical signal. The outputs of the photodiodes are then transmitted to the data processing system for image reconstruction.

An exemplary CT imaging system comprises an energy discriminating (ED) and/or multi energy (ME) CT imaging system that may be referred to as an EDCT and/or MECT imaging system. The EDCT and/or MECT imaging system in an example is configured to be responsive to different x-ray spectra. For example, a conventional third generation CT system acquires projections sequentially at different x-ray tube potentials. Two scans in an example are acquired either back to back or interleaved in which the tube operates at 80 kVp and 160 kVp potentials. Special filters in an example are placed between the x-ray source and the detector such that different detector rows collect projections of different x-ray energy spectra. The special filters that shape the x-ray spectrum in an example can be used for two scans that are acquired either back to back or interleaved. Energy sensitive detectors in an example are used such that each x-ray photon reaching the detector is recorded with its photon energy.

Exemplary ways to obtain the measurements comprise: (1) scan with two distinctive energy spectra, (2) detect photon energy according to the depth from the incident surface for energy deposition in the detector, and (3) photon counting. EDCT/MECT provides energy discrimination and material characterization. For example, in the absence of object scatter, the system derives the behavior at any other energy based on the signal from two regions of photon energy in the spectrum: the low-energy and the high-energy portions of the incident x-ray spectrum. In an exemplary energy region of medical CT, two physical processes dominate the x-ray attenuation: (1) Compton scatter and the (2) photoelectric effect. The detected signals from two energy regions provide sufficient information to resolve the energy dependence of the material being imaged. Furthermore, detected signals from the two energy regions provide sufficient information to determine the relative composition of an object composed of two materials.

The conventional basis material decomposition (BMD) algorithm is based on the concept that in the energy region for medical CT, the x-ray attenuation of any given material can be represented by a proper density mix of two other materials, referred to as the basis materials. Based on the projections acquired at the two incident x-ray spectra, the BMD algorithm computes two sets of new projections, corresponding to two new CT images that each represents the equivalent density of one of the basis materials. Since a material density is independent of x-ray photon energy, these images are approximately free of beam-hardening artifacts. An operator can choose the basis material to target a certain material of interest, for example, to enhance the image contrast.

Photon counting detectors saturate at high count rate due to pile up effects. The flux rate at which the detector saturates can be calculated from the count rate divided by the pixel area. The saturation count rate is inversely proportional to the dead time of the detector. The dead time in a direct conversion layer is determined by charge transport time in the material and is related to the mobility of the material. In a direct conversion detector with a single layer, a common cathode electrode biased at large negative voltage is located on one side of the detector layer. A pixelated anode biased close to ground is located on the other side of the layer. Signals from anode pixels are routed through the substrate and/or circuit board to the readout electronics. Cadmium telluride (CdTe) and cadmium zinc telluride (CZT) comprise semiconductor materials with high stopping power, for example, x-ray attenuation, but low mobility and long charge transport time. For example, a single layer direct conversion detector of CZT or CdTe with 1.0 to 5.0 mm thickness typically saturates at about one million to ten million counts per sec per millimeter squared. Silicon (Si) and gallium arsenide (GaAs) comprise semiconductor materials with high mobility and short charge transport time, but low x-ray stopping power, for example, x-ray attenuation.

Therefore, it would be desirable to design an apparatus and method to promote high, enhanced, good, improved, and/or increased stopping power and/or mobility in an energy discriminating (ED) detector. It would be further desirable to promote high-speed charge transport substantially without loss in an ED detector. It also would be desirable to provide and/or produce greater, enhanced, increased, and/or improved selectivity between high and low x-ray energy an ED detector. Additionally, it would be desirable to provide and/or produce basis material decomposition (BMD) at lower and/or reduced x-ray dose and/or in shorter and/or reduced exposure time.

BRIEF DESCRIPTION OF THE INVENTION

The invention in an implementation encompasses a CT system that overcomes the aforementioned drawbacks. A CT detector includes a plurality of direct conversion layers having dissimilar material compositions and reduces artifacts due to pile up effects.

Therefore, according to one aspect of the present invention, a diagnostic imaging system includes a high frequency electromagnetic energy source that emits a beam of high frequency electromagnetic energy toward an object to be imaged. An energy discriminating (ED) detector receives high frequency electromagnetic energy emitted by the high frequency electromagnetic energy source. The ED detector includes a first direct conversion layer and a second direct conversion layer. The first direct conversion layer comprises a first direct conversion material and the second direct conversion layer comprises a second direct conversion material that is different from the first direct conversion material. A data acquisition system (DAS) is operably connected to the ED detector and a computer operably connected to the DAS.

In accordance with another aspect of the present invention, a CT detector includes a first direct conversion layer having a first array of electrical contacts and constructed to directly convert radiographic energy to electrical signals representative of energy sensitive radiographic data. The first direct conversion layer includes a first direct conversion material. The CT detector includes a second direct conversion layer having a second array of electrical contacts and constructed to directly convert radiographic energy passing through the first direct conversion layer to electrical signals representative of energy sensitive radiographic data. The second direct conversion layer includes a second direct conversion material distinct from the first direct conversion material.

According to yet another aspect of the present invention, a diagnostic imaging detector includes a stacked arrangement of a first direct conversion sensor layer and a second direct conversion sensor layer. The first direct conversion sensor layer is located between a radiographic energy source and the second direct conversion sensor layer. The first direct conversion sensor layer includes a first direct conversion material, and the second direct conversion sensor layer includes a second direct conversion material that is different from the first direct conversion material.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings:

FIG. 3 is a representation of a top perspective view of an energy discriminating (ED) detector of an implementation of the system of FIG. 1.

FIG. 4 is a representation of a bottom perspective view of a plurality of contacts on a downstream face of a direct conversion layer of the ED detector of FIG. 3.

FIG. 5 is a side sectional representation of the ED detector of FIG. 4 along line 5-5 thereof and illustrates an implementation of an exemplary arrangement of pixels and voltage electrodes.

FIG. 6 is similar to FIG. 5 and illustrates another implementation of an exemplary arrangement of pixels and voltage electrodes.

DETAILED DESCRIPTION OF THE PREFERRED EMBODIMENT

Exemplary diagnostics devices comprise x-ray systems, magnetic resonance (MR) systems, ultrasound systems, computed tomography (CT) systems, positron emission tomography (PET) systems, and other types of imaging systems. Exemplary applications of x-ray sources comprise imaging, medical, security, and industrial inspection applications. The operating environment of an exemplary implementation comprises a 64-slice CT system. However, it will be appreciated by those skilled in the art that an exemplary implementation is applicable for use with single-slice or other multi-slice configurations. Moreover, an exemplary implementation is employable for the detection and conversion of x-rays. However, one skilled in the art will further appreciate that an exemplary implementation is employable for the detection and conversion of other high frequency electromagnetic energy and/or high frequency polychromatic electromagnetic energy. An exemplary implementation is employable with a "third generation" CT scanner and/or other CT systems.

Figure 1:
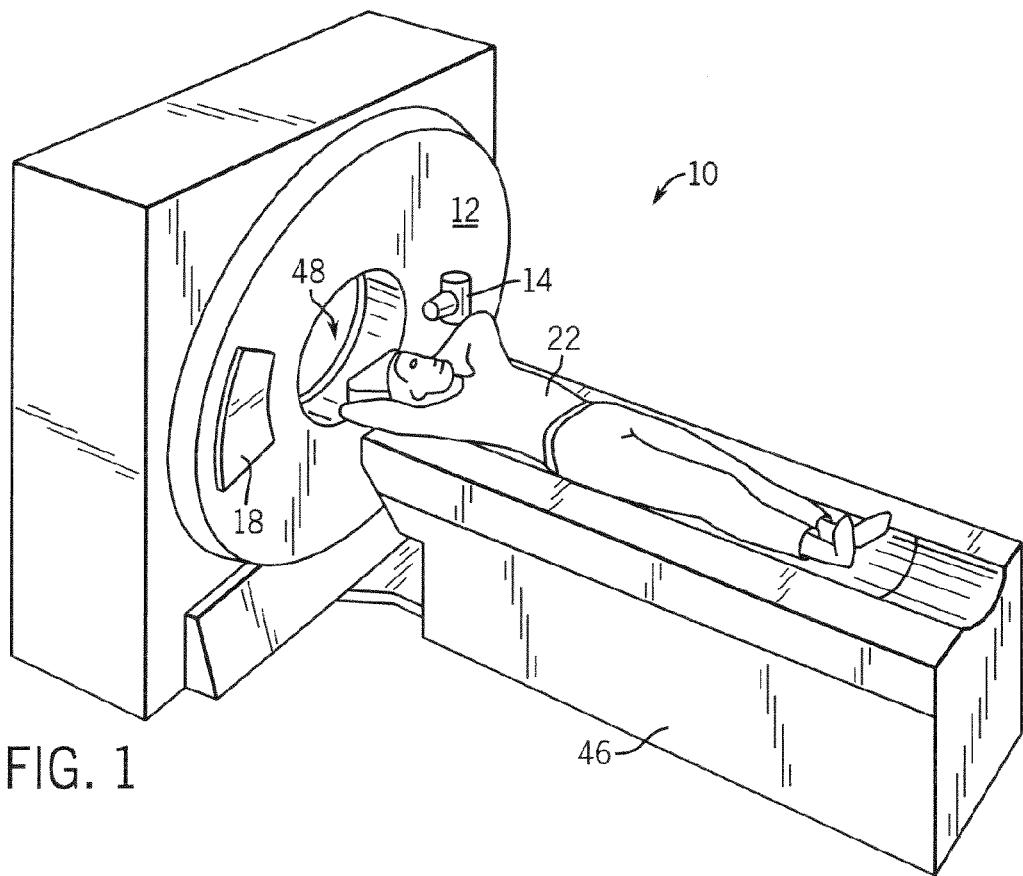
FIG. 1 is a pictorial view of an implementation of a CT imaging system.
Figure 2:
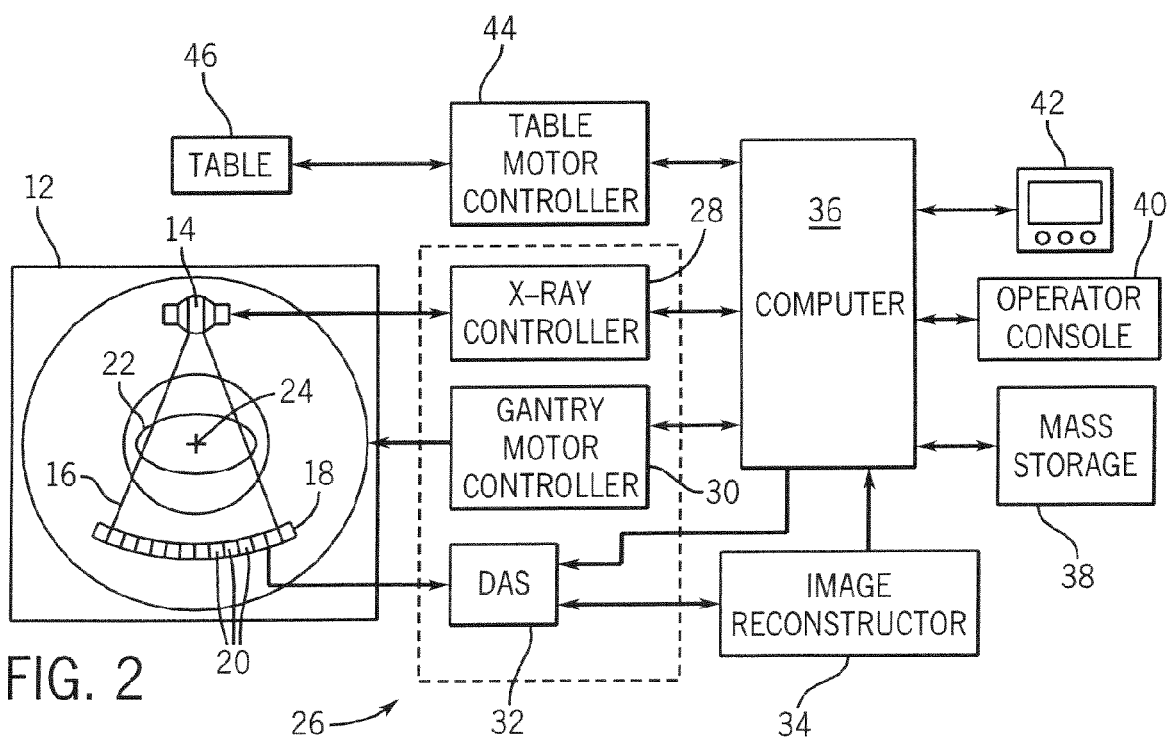
FIG. 2 is a block schematic diagram of an implementation of the system of FIG. 1.

Referring to FIGS. 1 and 2, a diagnostic and/or computed tomography (CT) imaging system 10 is shown as including a gantry 12 representative of a "third generation" CT scanner. The CT imaging system 10 in an example comprises an energy discriminating (ED) and/or multi energy (ME) CT imaging system that may be referred to as an EDCT and/or MECT imaging system. Gantry 12 has an x-ray source 14 that projects a beam of x-rays 16 toward a detector array 18 on the opposite side of the gantry 12. Detector array 18 is formed by a plurality of detectors such as energy discriminating (ED) detectors 20 which together sense the projected x-rays that pass through a medical patient 22. An exemplary ED detector 20 comprises a photon counting x-ray detector. Each ED detector 20 in an example produces an electrical signal that represents the intensity of an impinging x-ray beam and hence the attenuated beam as it passes through the patient 22. The ED detector 20 in an example obtains ED readout from the beam of x-rays 16. During a scan to acquire x-ray projection data, gantry 12 and the components mounted thereon rotate about a center of rotation 24, as will be appreciated by those skilled in the art.

Rotation of gantry 12 and the operation of x-ray source 14 are governed by a control mechanism 26 of CT system 10. Control mechanism 26 includes an x-ray controller 28 that provides power and timing signals to an x-ray source 14 and a gantry motor controller 30 that controls the rotational speed and position of gantry 12. A data acquisition system (DAS) 32 in control mechanism 26 samples analog data from the ED detectors 20 and converts the data to digital signals for subsequent processing. An image reconstructor 34 receives sampled and digitized x-ray data from DAS 32 and performs high speed reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 and gantry 12. Particularly, table 46 moves portions of patient 22 through a gantry opening 48.

EDCT/MECT provides energy discrimination and material characterization. For example, in the absence of object scatter, the system derives the behavior at any other energy based on the signal from two regions of photon energy in the spectrum: the low-energy and the high-energy portions of the incident x-ray spectrum. In an exemplary energy region of medical CT, two physical processes dominate the x-ray attenuation: (1) Compton scatter and the (2) photoelectric effect. The detected signals from two energy regions provide sufficient information to resolve the energy dependence of the material being imaged. Furthermore, detected signals from the two energy regions provide sufficient information to determine the composition of an object 22 and/or components within the object 22. The composition of the object 22 may be expressed as equivalent densities of two basis materials, as a basis material decomposition (BMD). An exemplary ED detector 20 provides, allows, and/or produces greater selectivity between high and low x-ray energy, for example, to provide, allow, produce, and/or yield basis material decomposition (BMD) at lower and/or reduced x-ray dose and/or in shorter and/or reduced exposure time.

In a further example, the composition of an object 22 may be quantified by an effective atomic number. The effective atomic number may comprise a simple functional relationship to the ratio of the basis material densities that equivalently compose the object 22, in the basis material decomposition (BMD). For example, the difference between the effective atomic number of acrylic and water comprises one atomic number unit. An exemplary ED detector 20 may determine an effective atomic number of an object 22 with a standard deviation of less than one atomic number unit within one second scan time. In another example, a scan time for rotation of a CT gantry 12 of approximate 0.2 to 0.5 seconds serves to mitigate the effects of object motion that otherwise may blur the image and prevents material composition determination especially at object boundaries. Because of the efficient use of incident x-ray flux, the ED detector 20 in an example serves in a CT system with short acquisition time to accurately image the composition of objects 22 with vibratory, cardiac, respiratory, and/or abdominal motion.

Referring to FIG. 3, an exemplary ED detector 20 comprises a plurality of layers such as a top and/or upstream layer 302, a bottom and/or downstream layer 304, a collimator 306, and one or more supports 308. For example, the ED detector 20 comprises two pixelated layers of at least two different direct conversion materials operated in photon counting mode with energy binning capability. The ED detector 20 in an example receives the beam of x-rays 16 at a plurality of layers, for example, the upstream layer 302 and the downstream layer 304.

The direct conversion material 310 of the upstream layer 302 in an example is operable in any one of an energy integrating mode and/or a photon counting mode. The direct conversion material 318 of the downstream layer 304 in an example is operable in any one of an energy integrating mode and/or a photon counting mode. The upstream and downstream layers 302 and 304 in an example may be read out in photon counting mode with multiple energy thresholds or integrating mode or in a desired and/or selected combination of photon counting mode and integrating mode. An exemplary ED detector 20 comprises at least one material operating in photon counting mode, for example, to provide, allow, and/or produce a desired, enhanced, selected, and/or increased energy selectivity between high and low x-ray energy, for example, to provide, allow, produce, and/or yield basis material decomposition (BMD) at lower and/or reduced x-ray dose and/or in shorter and/or reduced exposure time. A further exemplary ED detector 20 comprises a photon counting detector with two layers that allow operation at high and/or increased flux rates. Photon counting operation at incident flux rates to levels of fifty million to one hundred million counts per sec per millimeter squared in an example provide a capability to establish the composition of object 20, or parts therein, at a resolution of one atomic number unit within a scan of one second, for example, mitigating the effects of object motion.: Photon counting operation at incident flux rates above 10 million counts per sec per millimeter squared provide a capability to establish the composition of object 20, or parts therein, at a resolution of 1 atomic number unit within a scan of 1 sec and thereby mitigating the effects of object motion.

Exemplary upstream and downstream layers 302, 304 serve to achieve greater selectivity between high and low x-ray energy and to provide basis material decomposition at lower x-ray dose or in shorter exposure time. An exemplary implementation that comprises two layers with different materials serves to provide a multi-energy threshold, photon counting detector with higher flux rate, for example, than is capable with a single layer or layered designs with a common material for each layer. An exemplary flux rate capability comprises fifty million to one hundred million counts per second per millimeter squared, for example, at low detector quantum efficiency (DQE) but with fidelity sufficient to measure the attenuation of object 20 at all projected points across the detector and thereby providing capability to create a CT image without artifacts. A photon counting detector without a high flux rate capability will produce bad inputs to the reconstruction 34 and create image artifacts. An exemplary implementation employs different materials for the upstream and downstream layers 302, 304, for example, to provide a combination of stopping power and charge transport time, for example, to achieve increased, flux rate capability and/or high detective quantum efficiency (DQE), for example, at low count rate.

An exemplary implementation provides high count rate capability and good detective quantum efficiency at low count rate. An exemplary implementation improves energy discrimination functionality, for example, by a desired and/or selected preservation of photon statistics and good and/or enhanced spectral characteristics of the combined two-layer system. An exemplary implementation comprises a photon counting x-ray detector with energy discrimination capability as the ED detector 20, for example, constructed and/or formed through employment of pixelated layers contacted from at least two different direct conversion materials. An exemplary top layer as the upstream layer 302 in an example serves to stop only a small fraction such as up to fifty percent of the beam of x-rays 16 and is constructed and/or formed from direct conversion material with high mobility and fast charge transport. An exemplary bottom layer as the downstream layer 304 in an example is constructed and/or formed from a thick layer of direct conversion material with high stopping power.

An exemplary upstream layer 302 comprises direct conversion layer and/or material 310 and circuit board 312. The direct conversion material 310 in an example comprises a monolithic semiconductor crystal, silicon (Si), indium phosphide (InP), gallium arsenide (GaAs), and/or a low atomic number material. The upstream layer 302 in an example comprises high mobility of charge transport, low x-ray attenuation, low x-ray stopping power, and/or low x-ray absorption in CT and/or x-ray radiography applications, for example, in a thin formation and/or construction, relative to the downstream layer 304. An exemplary direct conversion material 310 comprises a crystal with high perfection and/or high photon counting rates and/or properties relative to direct conversion layer and/or material 318 of the downstream layer 304. The direct conversion material 310 in an example is operable in any one of an energy integrating mode and/or a photon counting mode. The direct conversion material 310 may also be compatible with conventional semiconductor processing to create small pixel area, sub-elements, and/or signal processing circuits.

In an exemplary implementation, high mobility and small thickness of the direct conversion material 310 promotes a fast charge collection and high flux rate capability for the upstream layer 302. The direct conversion material 310 in an example comprises stability and gain suitable and/or desirable for employment as an integration sensor. An exemplary dynamic capability of the direct conversion material 310 allows and/or provides operation in both photon counting and integration mode, for example, through selection and/or choice of material for the upstream layer 302. Semiconductor materials such as Si, InP, and GaAs for the direct conversion material 310 in an example serve to allow and/or provide a capability, for example, for fine pitch lithography, the routing of fine and/or small area pixels, and/or the fabrication of active switching and logic circuits on the material surface. Materials which can be deposited as a thin layer like mercuric iodide are suitable for the direct conversion material 310. An exemplary implementation with such fine area pixels and circuit capabilities in an example may be leveraged to enhance, improve, and/or increase the flux rate for a given count rate limit and/or to dynamically switch the readout configuration of the upstream layer 302.

Exemplary thicknesses of the direct conversion material 310 in a general direction of the beam of x-rays 16 comprise 0.1 mm to 3.0 mm, for example, 0.2 mm. Exemplary mobilities of charge transport of the direct conversion material 310 comprises two thousand (2000) cm$^2$/sec-volt for Si and six thousand (6000) cm$^2$/sec-volt for GaAs. The upstream layer 302 in an example saturates in a photon counting readout mode at a flux rate of fifty million to two hundred fifty million counts per sec per millimeter squared incident to the upstream layer 302. At incident flux higher than this saturation level in the example the upstream layer 302 may operate in an integration readout mode or with a small pixel sub-element area.

The circuit board 312 in an example comprises a rigid or flexible circuit board or multi-layer ceramic substrate. An exemplary circuit board 312 comprises one or more digital readout electronics and/or ASICs (application specific integrated circuits) 314 and one or more system connectors 316.

An exemplary downstream layer 304 comprises direct conversion layer and/or material 318 and circuit board 322. The direct conversion material 318 in an example comprises a monolithic semiconductor crystal with high stopping power, cadmium telluride (CdTe), cadmium zinc telluride (CZT), high atomic number, and/or a photon-counting material, for example, traditionally employed with relatively high x-ray energy. An exemplary direct conversion material 318 comprises a crystal with low perfection and/or low photon counting rates and/or properties relative to the direct conversion material 310 of the upstream layer 302. The direct conversion material 318 in an example is operable in any one of an energy integrating mode and/or a photon counting mode.

Exemplary thicknesses of the direct conversion material 318 in a general direction of the beam of x-rays 16 comprise 2.0 mm to 8 mm, for example, 3 mm. An exemplary mobility of charge transport of the direct conversion material 318 comprises one thousand (1000) cm$^2$/sec-volt for CZT or CdTe.

The circuit board 322 in an example comprises a rigid or flexible circuit board. An exemplary circuit board 322 comprises one or more digital readout electronics and/or ASICs 324 and one or more system connectors 326. The digital readout electronics and/or ASICs 314, 324 in an example serve to combine signals from the upstream and downstream layers 302, 304, for example, in a flexible manner as a function of flux rate. Referring to FIGS. 3 and 4, at exemplary low flux rate, the digital readout electronics and/or ASICs 314, 324 in an example add signals from exemplary superimposed arrangements 404, 406 of pixels 402 from each of the upstream and downstream layers 302, 304. Exemplary low flux rates comprise flux rates below fifty million to one hundred million counts per sec per millimeter squared incident to the ED detector 20. At exemplary high flux rate, the digital readout electronics and/or ASICs 314, 324 in an example takes the signal only from the top and/or upstream layer 302 since the bottom and/or downstream layer 304 in an example may be saturated. An exemplary high flux rate comprises over one hundred million counts per second per millimeter squared. Exemplary flexible binning of small area subpixel elements of the ED detector 20 in an example may extend the flux rate range at which the upstream layer 302 may operate in photon counting readout mode. Exemplary readout electronics for the ASICs 314 and/or 324 in an example may serve to accomplish such binning.

Photon counting detectors may saturate at high count rate due to pile up effects. The flux rate at which a detector saturates may be calculated from the count rate divided by the pixel area of the detector. Smaller pixels in an example provide higher flux rate capability at the expense of increased number of readout channels, for example, coupled with the ASICs 314 for output to the DAS 32. The saturation count rate may be inversely proportional to the dead time of the detector. The dead time in a direct conversion layer may be determined by charge transport time in the material and may be related to the mobility of the material.

Cadmium telluride (CdTe) and cadmium zinc telluride (CZT) comprise semiconductor materials with high stopping power, but low mobility and long charge transport time. Silicon (Si), indium phosphide (InP), and gallium arsenide (GaAs) comprise semiconductor materials with high mobility and short charge transport time, but poor x-ray stopping power. Too thick a layer of Si, InP, or GaAs in an example would be needed for that layer alone to stop a significant fraction of the incident x-ray photons. To stop over ninety percent of the incident x-rays of the beam of x-rays 16 in an example Si would need to be 4.0 cm thick or GaAs would need to 0.5 cm thick for an exemplary energy range employed for exemplary medical and/or industrial CT. Si, InP, and GaAs in an example are capable of incorporating the functionality of both x-ray sensors with fine pitch and signal processing circuits on the same layer, for example, upstream and downstream layers 302 and/or 304.

Circuit capability from the computer and/or communication industry in an example may be employed to configure the ED detector 20, for example, with fine pitch pixels and logic circuits that enhance and/or increase the flux rate such as for a given count rate limit. Semiconductor processing available for Si, InP, HgI2, or GaAs in an example serves to form and/or create pixel size less than or equal to approximately 1000 microns ($1000 \times 10^{-6}$ meter; 1000 μm). Examples of signal processing circuits comprise switches, logic circuits, and amplifiers. In an exemplary implementation, switch circuits on the upstream and/or downstream layers 302, 304 may dynamically combine sub elements of a pixel of the ED detector 20 at low flux rate and sub elements of a pixel of the ED detector 20 at high flux rate, for example, to direct a smaller range of count rates to the readout channel (e.g., digital readout electronics and/or ASICs 314, 324) to the DAS 32 at high flux rate. An exemplary implementation switch circuits on the upstream and downstream layers 302 and/or 304 may select large area pixel sub elements at low flux rate and small area pixel sub elements at high flux rate, for example, to keep the count rate to the DAS readout channel more nearly constant or below a saturation threshold. An exemplary upstream layer 302 comprises functionality for employment in the ED detector 20 as well as for at least a part of the readout electronics, for example, employable with the ASIC 314.

As exemplary coordination of operation of photon counting and integration modes over the possible incident flux rate, the upstream layer 302 in an example serves to stop an appropriate, selected, and/or desired percentage of incident photons of the beam of x-rays 16 relative to a remaining percentage of the incident photons of the beam of x-rays 16 stopped by the downstream layer 304. The total number of x-rays incident to the ED detector 20 in an example is stopped by the combination of the upstream layer 302 and downstream layer 304. The percentage of x-rays stopped by the upstream layer 302 in an example may be determined by the combination of the thickness and density of direct conversion material 310. The direct conversion material 318 in an example comprises sufficient thickness, for example, 2.0 mm to 8.0 mm, to stop the remaining photons after transmission of the beam of x-rays 16 through the upstream layer 302. For example, the upstream layer 302 serves to stop approximately fifteen to fifty percent of the x-rays and/or photons of the beam of x-rays 16. The remaining fifty to eighty five percent of the x-rays are stopped in the downstream layer 304.

In an exemplary implementation, a low and/or poor stopping power represented by a low x-ray attenuation constant and a thinness of the direct conversion material 310 of the upstream layer 302 result in a reduced fraction of the beam of x-rays 16 interacting with the direct conversion material 310. As a result of this fraction in an example and a fast charge transport time in the upstream layer 302, an exemplary photon counting response remains a valid measurement of x-ray flux, for example, up to very high flux rates such as fifty million to one hundred million counts per sec. In an exemplary implementation, the statistical significance of the x-ray signal incident to the ED detector 20 is well preserved by the photon counting detector response, for example, if all and/or substantially all the incident x-ray photons are counted in the combination of detector layers of the ED detector 20. An exemplary statistical significance of the response from the upstream layer 302 alone at low count rate may be poor, for example, because of the small number of interaction events. So, an exemplary implementation at low count rate combines the signal for each energy bin from each pixel in the upstream layer 302 with a corresponding pixel in the downstream layer 304. An exemplary downstream layer 304 comprises high stopping power so most and/or over ninety percent of beam of x-rays 16 may be absorbed within the ED detector 20, for example, preserving the integrity of the statistics. In an exemplary implementation, the energy information is well preserved if the spectral ranges of the incident x-ray signal incident to the detector surface are represented by the multi-threshold count ranges in the photon counting detector as the ED detector 20.

The upstream layer 302 in an example obtains ED information from one of a low or high approximate energy level and/or range of the beam of x-rays 16 and the downstream layer 304 in an example obtains ED information from the other of the low or high approximate energy level and/or range of the beam of x-rays 16. An exemplary photon counting energy discriminating detector as the ED detector 20 may identify a threshold between the low and high energy ranges at approximately 60-80 keV for a spectrum between 100 to 140 kVp, for example, applicable for a medical diagnostic application such as CT. For example, all and/or substantially all energies below the threshold may be counted as in the low range and all and/or substantially all energies above the threshold may be counted as in the high range. An exemplary dual layer detector as the ED detector 20 may obtain low energy information primarily from an upstream layer 302 and high energy information primarily from a downstream layer 304. In another example, the photon counting operation of either the upstream or downstream layer 302, 304 provides both low and high energy, for example, that may yield improved energy selectivity and/or material composition, for example, in shorter time and/or at lower dose.

The DAS 32 in an example couples the ED information from the upstream layer 302 and the ED information from the downstream layer 304 of the ED detector 20 to the computer 36. The computer 36 in an example employs the ED information from one or more of the layers to perform material decomposition of the object 22.

Referring to FIGS. 4 through 8, ED detector 20 in an example comprises a plurality of semiconductor layers as the upstream layer 302 and the downstream layer 304. The semiconductor layers as the upstream layer 302 and the downstream layer 304 in an example during an exemplary fabrication are formed to comprise a plurality of contacts, detection and/or conversion elements, electronically pixelated structures, and/or pixels 402. One or more exemplary electronic pixelations may be accomplished and/or implemented through application and/or employment of two-dimensional (2D) arrays and/or arrangements 404, 406 of pixels 402 onto the semiconductor layers as the upstream layer 302 and the downstream layer 304. Exemplary pixelation is defined two-dimensionally across the width and length of the semiconductor layers as the upstream layer 302 and the downstream layer 304.

Referring to FIGS. 4 and 5, an exemplary implementation of ED detector 20 comprises a plurality of contiguous high voltage electrodes 408, 410 for the semiconductor layers as the upstream layer 302 and the downstream layer 304. Exemplary high voltage electrodes 408, 410 are connected to a power supply (not shown) and serve to power the semiconductor layers as the upstream layer 302 and the downstream layer 304, for example, during an exemplary x-ray or gamma ray detection. The high voltage electrodes 408, 410 in an example serve as cathodes, as will be appreciated by those skilled in the art.

The corresponding low voltage, anode electrodes 404 and 406 in an example serve to define the charge collection area of the pixels of the ED detector 20 in the direct conversion layers 310, 318. In FIG. 5, an exemplary layered detector as the ED detector 20 is configured such that the beam of x-rays 16 is incident to the high voltage electrodes 408, 410 as the cathode side of each layer 302, 304. In FIG. 6, an exemplary layered detector as the ED detector 20 is configured such that the beam of x-rays 16 is incident to the high voltage electrode 408 as the cathode side of the upstream layer 302 and the high voltage electrode 410 as the anode side of the downstream layer 304.

Figure 7:
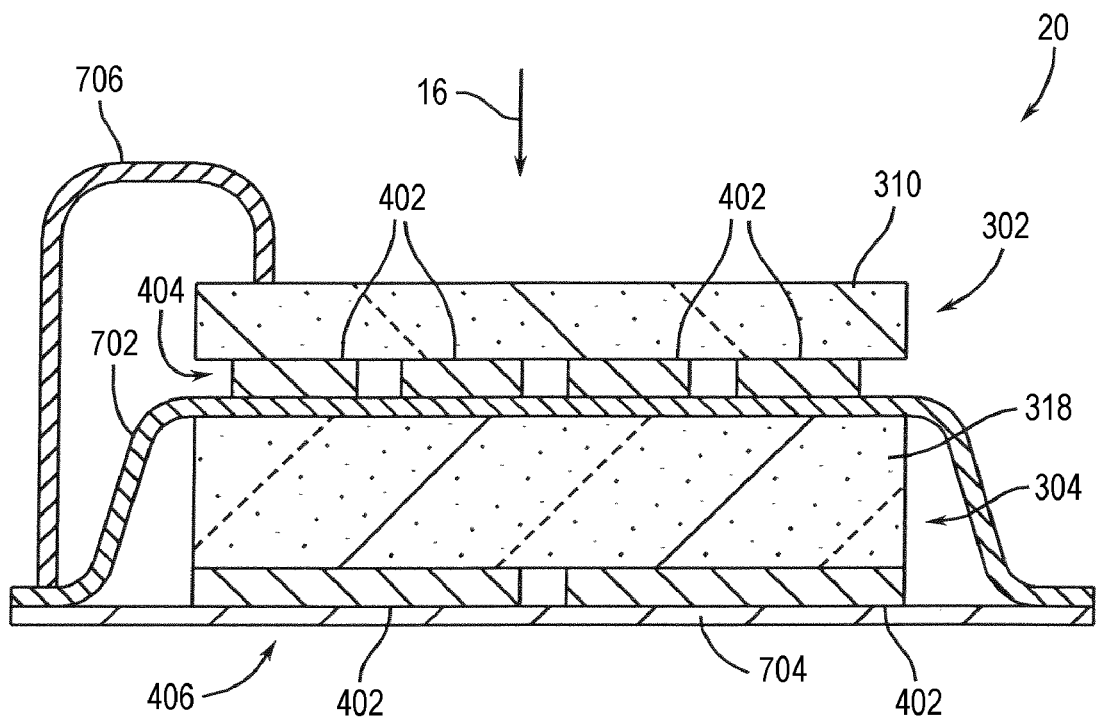
FIG. 7 is a representation of another exemplary implementation of the ED detector of FIG. 3 with a flex layer, a substrate, and a high voltage bias wire.
Figure 8:
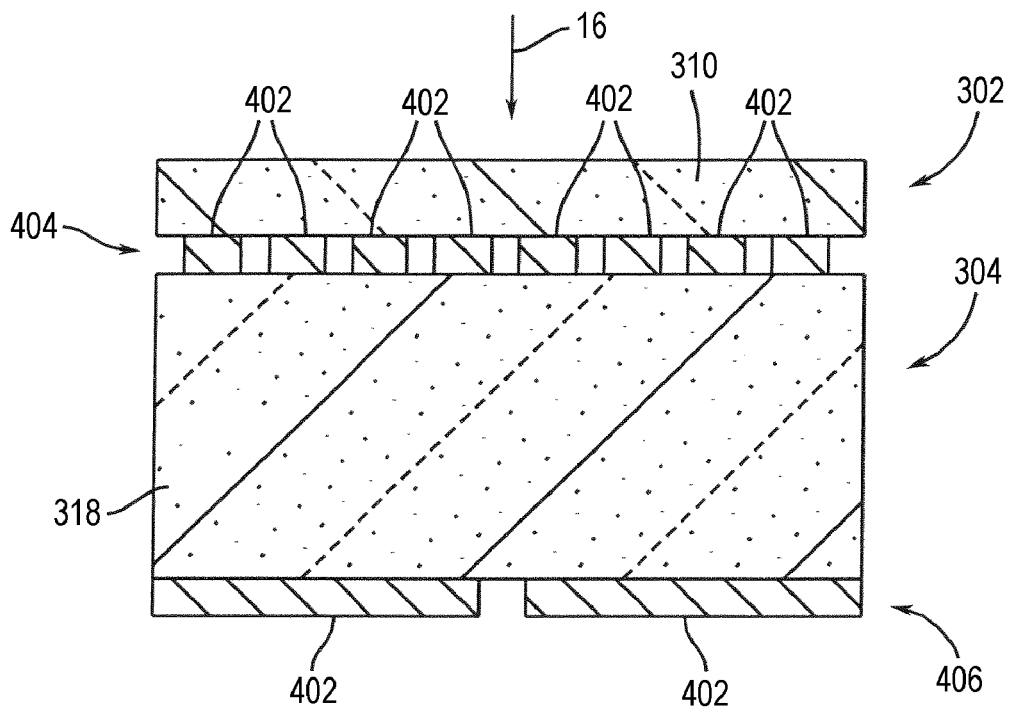
FIG. 8 is a representation of a further exemplary implementation of the ED detector of FIG. 3 and illustrates an upstream layer and a downstream layer that may comprise different direct conversion materials coupled with arrangements pixels.

Referring to FIG. 7, yet another exemplary implementation of ED detector 20 comprises a flex layer 702, a substrate 704, and a high voltage bias wire 706. The flex layer 702 separates the upstream layer 302 and the downstream layer 304. The substrate 704 supports the upstream layer 302, the downstream layer 304, the flex layer 702, and the high voltage bias wire 706.

Again referring to FIGS. 4 through 8, one or more exemplary implementations of ED detector 20 comprise the upstream layer 302 and the downstream layer 304 that may comprise different direct conversion materials coupled with arrangements 404, 406 of pixels 402. Exemplary characteristics may vary, for example, the thicknesses, the number and size, the pixel pitch, the contact area, the saturation characteristics, the charge collection time. As will be appreciated by those skilled in the art, the charge collection time may decrease as the thickness of a conversion layer decreases and the size of the detector element decreases. In addition, the charge collection time of a detector layer may be approximately proportional to the thickness of the conversion layer or detector element size, whichever is smaller, divided by the mobility and electric field across the detector layer. The count rate saturation threshold may be larger for smaller pixel size. Smaller pixel area may imply a higher flux rate saturation threshold relative for a given count rate saturation threshold in proportion to the area reduction. As conversion layer thickness and/or detector element size decreases, the flux rate limit for the corresponding detector layer may increase, for example, to enhance, adjust, and/or improve the saturation characteristics for that layer of the CT detector. For example, differences in thickness between direct conversion components may be varied to achieve different absorption and flux rate characteristics.

Figure 9:
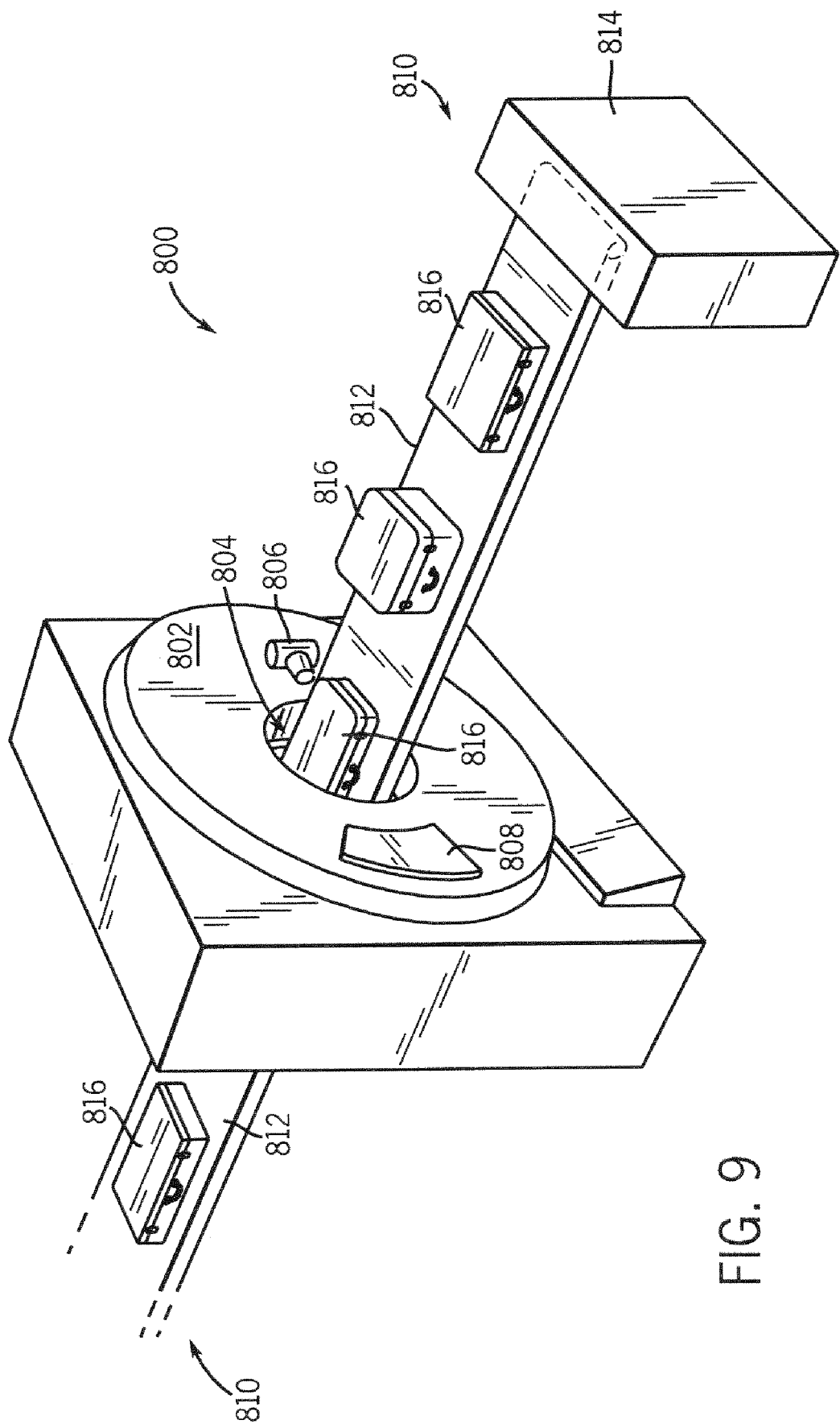
FIG. 9 is a pictorial view of a CT system for use with a non-invasive package inspection system.

Referring now to FIG. 9, package/baggage inspection system 800 includes a rotatable gantry 802 having an opening 804 therein through which packages or pieces of baggage may pass. The rotatable gantry 802 houses an x-ray and/or high frequency electromagnetic energy source 806 as well as a detector assembly 808 having scintillator arrays comprised of scintillator cells. A conveyor system 810 is also provided and includes a conveyor belt 812 supported by structure 814 to automatically and continuously pass packages or baggage pieces 816 through opening 804 to be scanned. Objects 816 are fed through opening 804 by conveyor belt 812, imaging data is then acquired, and the conveyor belt 812 removes the packages 816 from opening 804 in a controlled and continuous manner. As a result, postal inspectors, baggage handlers, and other security personnel may non-invasively inspect the contents of packages 816 for explosives, knives, guns, contraband, etc.

An implementation of the system 10 and/or 800 in an example comprises a plurality of components such as one or more of electronic components, hardware components, and/or computer software components. A number of such components can be combined or divided in an implementation of the system 10 and/or 800. An exemplary component of an implementation of the system 10 and/or 800 employs and/or comprises a set and/or series of computer instructions written in or implemented with any of a number of programming languages, as will be appreciated by those skilled in the art. An exemplary technical effect is one or more exemplary and/or desirable functions, approaches, and/or procedures. An implementation of the system 10 and/or 800 in an example comprises any (e.g., horizontal, oblique, or vertical) orientation, with the description and figures herein illustrating an exemplary orientation of an implementation of the system 10 and/or 800, for explanatory purposes.

An implementation of the system 10 and/or the system 800 encompasses an article. The article comprises one or more computer-readable signal-bearing media. The article comprises means in the one or more media for one or more exemplary and/or desirable functions, approaches, and/or procedures.

An implementation of the system 10 and/or the system 800 in an example employs one or more computer readable signal bearing media. A computer-readable signal-bearing medium in an example stores software, firmware and/or assembly language for performing one or more portions of one or more implementations. An example of a computer-readable signal bearing medium for an implementation of the system 10 and/or the system 800 comprises the recordable data storage medium of the image reconstructor 34, and/or the mass storage device 38 of the computer 36. A computer-readable signal-bearing medium for an implementation of the system 10 and/or the system 800 in an example comprises one or more of a magnetic, electrical, optical, biological, and/or atomic data storage medium. For example, an implementation of the computer-readable signal-bearing medium comprises floppy disks, magnetic tapes, CD-ROMs, DVD-ROMs, hard disk drives, and/or electronic memory. In another example, an implementation of the computer-readable signal-bearing medium comprises a modulated carrier signal transmitted over a network comprising or coupled with an implementation of the system 10 and/or the system 800, for instance, one or more of a telephone network, a local area network ("LAN"), a wide area network ("WAN"), the Internet, and/or a wireless network.

The steps or operations described herein are examples. There may be variations to these steps or operations without departing from the spirit of the invention. For example, the steps may be performed in a differing order, or steps may be added, deleted, or modified.

Therefore, according to one embodiment of the present invention, a diagnostic imaging system includes a high frequency electromagnetic energy source that emits a beam of high frequency electromagnetic energy toward an object to be imaged. An energy discriminating (ED) detector receives high frequency electromagnetic energy emitted by the high frequency electromagnetic energy source. The ED detector includes a first direct conversion layer and a second direct conversion layer. The first direct conversion layer comprises a first direct conversion material and the second direct conversion layer comprises a second direct conversion material that is different from the first direct conversion material. A data acquisition system (DAS) is operably connected to the ED detector and a computer operably connected to the DAS.

In accordance with another embodiment of the present invention, a CT detector includes a first direct conversion layer having a first array of electrical contacts and constructed to directly convert radiographic energy to electrical signals representative of energy sensitive radiographic data. The first direct conversion layer includes a first direct conversion material. The CT detector includes a second direct conversion layer having a second array of electrical contacts and constructed to directly convert radiographic energy passing through the first direct conversion layer to electrical signals representative of energy sensitive radiographic data. The second direct conversion layer includes a second direct conversion material distinct from the first direct conversion material.

According to yet another embodiment of the present invention, a diagnostic imaging detector includes a stacked arrangement of a first direct conversion sensor layer and a second direct conversion sensor layer. The first direct conversion sensor layer is located between a radiographic energy source and the second direct conversion sensor layer. The first direct conversion sensor layer includes a first direct conversion material, and the second direct conversion sensor layer includes a second direct conversion material that is different from the first direct conversion material.

The present invention has been described in terms of the preferred embodiment, and it is recognized that equivalents, alternatives, and modifications, aside from those expressly stated, are possible and within the scope of the appending claims.

What is claimed is:

1. A diagnostic imaging system, comprising:
a high frequency electromagnetic energy source that emits a beam of high frequency electromagnetic energy toward an object to be imaged;
an energy discriminating (ED) detector that receives high frequency electromagnetic energy emitted by the high frequency electromagnetic energy source, wherein the ED detector comprises a first direct conversion layer and a second direct conversion layer, wherein the first direct conversion layer comprises a first direct conversion material, wherein the second direct conversion layer comprises a second direct conversion material that is different from the first direct conversion material;
a data acquisition system (DAS) operably connected to the ED detector; and
a computer operably connected to the DAS.

2. The diagnostic imaging system of claim 1 wherein the first direct conversion layer comprises a semiconductor layer located upstream relative to the second direct conversion layer, wherein the semiconductor layer comprises a pixel size less than or equal to approximately 1000 μm and signal processing circuitry.

3. The diagnostic imaging system of claim 2 wherein the signal processing circuitry is fabricated on a surface of the semiconductor layer.

4. The diagnostic imaging system of claim 2 wherein the semiconductor layer has a thickness within a range of 0.1 mm to 3.0 mm in a general direction of the beam of high frequency electromagnetic energy.

5. The diagnostic imaging system of claim 4 wherein the thickness of the semiconductor layer is 0.2 mm.

6. The diagnostic imaging system of claim 1 wherein the first direct conversion material comprises one of Si, InP, ($HgI_2$) and GaAs.

7. The diagnostic imaging system of claim 6 wherein the second direct conversion material comprises one of cadmium telluride (CdTe) and cadmium zinc telluride (CZT).

8. The diagnostic imaging system of claim 1 wherein the first direct conversion layer has a higher mobility of charge transport than that of the second direct conversion layer.

9. A CT detector comprising:
a first direct conversion layer having a first array of electrical contacts and constructed to directly convert radiographic energy to electrical signals representative of energy sensitive radiographic data, and comprising a first direct conversion material; and
a second direct conversion layer having a second array of electrical contacts and constructed to directly convert radiographic energy passing through the first direct conversion layer to electrical signals representative of energy sensitive radiographic data, and comprising a second direct conversion material distinct from the first direct conversion material.

10. The CT detector of claim 9 wherein the first direct conversion material comprises one of silicon (Si), indium phosphide (InP), mercuric iodide ($HgI_2$), and gallium arsenide (GaAs).

11. The CT detector of claim 10 wherein the second direct conversion material comprises one of cadmium telluride (CdTe) and cadmium zinc telluride (CZT).

12. A diagnostic imaging detector, comprising:
a stacked arrangement of a first direct conversion sensor layer and a second direct conversion sensor layer, wherein the first direct conversion sensor layer is located between a radiographic energy source and the second direct conversion sensor layer;
wherein the first direct conversion sensor layer comprises a first direct conversion material; and
wherein the second direct conversion sensor layer comprises a second direct conversion material that is different from the first direct conversion material.

13. The diagnostic imaging detector of claim 12 wherein the first direct conversion material of the first direct conversion sensor layer serves to saturate at a first saturation threshold; and
wherein the second direct conversion material of the second direct conversion sensor layer serves to saturate at a second saturation threshold different from the first saturation threshold.

14. The diagnostic imaging detector of claim 13 further comprising a signal processing circuit fabricated on the first direct conversion material, wherein the signal processing circuitry provides for switching operation of the first direct conversion material from a photon counting mode below a saturation threshold to an integration mode above the saturation threshold.

15. The diagnostic imaging detector of claim 14 wherein the signal processing circuitry is configured to dynamically combine sub-pixel elements of the first direct conversion sensor layer for readout in the photon counting mode and to readout single sub-pixel elements of the first direct conversion sensor layer in the integration mode.

16. The diagnostic imaging detector of claim 12 wherein the first direct conversion sensor layer comprises a first plurality of electrical sensors configured to directly convert radiographic energy to electrical signals representative of energy sensitive radiographic data; and
wherein the second direct conversion sensor layer comprises a second array of electrical contacts configured to directly convert radiographic energy to electrical signals representative of energy sensitive radiographic data.

17. The diagnostic imaging detector of claim 12 wherein the first direct conversion material of the first direct conversion sensor layer comprises a low atomic number direct conversion material.

18. The diagnostic imaging detector of claim 17 wherein the low atomic number direct conversion material comprises one of silicon (Si), indium phosphide (InP), mercuric iodide ($HgI_2$), and gallium arsenide (GaAs).

19. The diagnostic imaging detector of claim 12 wherein the second direct conversion material of the second direct conversion sensor layer comprises a high atomic number direct conversion material.

20. The diagnostic imaging detector of claim 19 wherein the high atomic number direct conversion material comprises cadmium telluride (CdTe) or cadmium zinc telluride (CZT).

* * * * *